June 18, 1940.          F. A. HART          2,205,260
TIRE GUARD
Filed Jan. 5, 1939
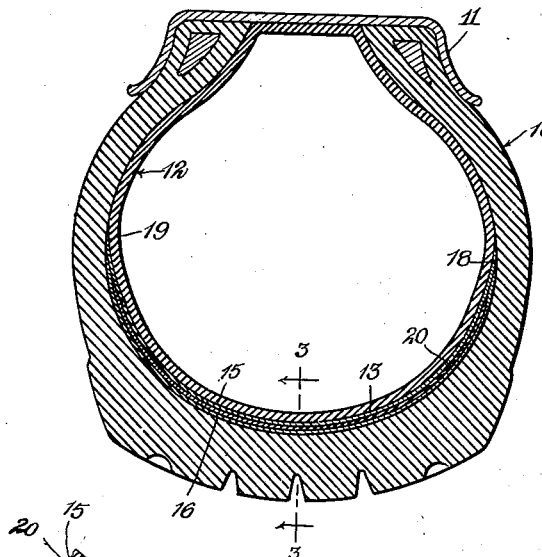
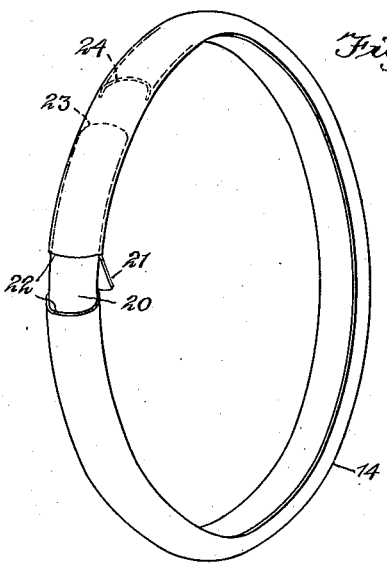
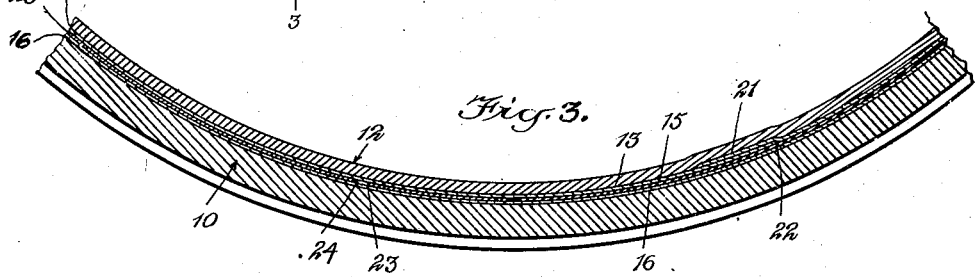
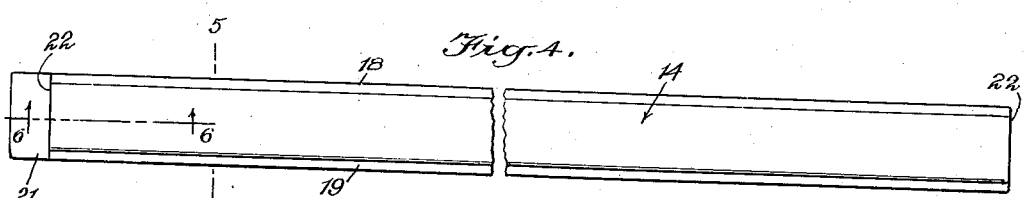
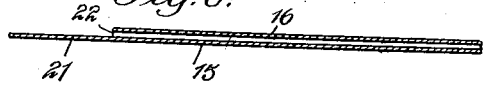
INVENTOR
Frank A. Hart Patented June 18, 1940

2,205,260

UNITED STATES PATENT OFFICE 2,205,260

TIRE GUARD

Frank A. Hart, New York, N. Y.

Application January 5, 1939, Serial No. 249,386

2 Claims. (Cl. 152—357)

My invention contemplates the adaption of my guard to the manufacture of shoes and may be built in at the factory. It is also adaptable to shoes now in use and may be easily and simply inserted in the standard shoe.

In the past there have been a number of linings of different types which have been used in shoes between the tube and the shoe to protect the tube. These linings, however, do not adequately protect the inner tube from materials working through the shoe. Moreover, they are hard to keep in place when the tube is deflated and rely solely upon the pressure of the tube to hold them in position. My improved guard will maintain its position regardless of whether or not the tube is inflated, and will not slide, slip nor overlap.

Referring more particularly to the drawing—

Fig. 1 is a cross-sectional view through a tire showing the guard in place;

Fig. 2 is a perspective view showing the guard out of the tire;

Fig. 3 is a cross-sectional view taken on the line 3—3 of Fig. 1;

Fig. 4 is a plan view showing the envelope which forms part of my guard;

Fig. 5 is a cross-sectional view taken on the line 5—5 of Fig. 4; and

Fig. 6 is a sectional view taken on the line 6—6 of Fig. 4.

As shown in Fig. 1, my guard is adapted to operate with a standard shoe 10 which is held in place by a rim 11 and has enclosed the usual inner tube 12. The guard 13 rests between the lower portion of the inner tube and the shoe and consists of a fabric envelope 14 having an inner surface 15 and an outer surface 16. The two strips 15 and 16 are fastened together near their outermost ends at 17 by stitching, cement or other suitable means, and flaps 18 and 19 extend laterally beyond the envelope proper in order to provide a gripping and protecting surface between the tube and the shoe at the side. The envelope serves to cover the guard 13 and to protect the tube 12 from any contact therewith. It will be appreciated that a rigid or semi-rigid guard member might injure the rubber tube 12. The lateral extensions 18 and 19 of the envelope, extending around the sides of the tube 12 and between the tube 12 and the shoe 10, position not only the envelope 14 but the guard 13 contained therein to prevent slipping in any direction especially when the tire is soft. A flexible metal member 20 is inserted in the envelope. The member 20 may be a flat piece of steel so flexible as to readily assume a U shape, or it may be previously shaped but made of flexible steel or other suitable metal or alloy.

In fitting the guard into a tire the end of the strip 15 is cut longer than the portion 16 to form a flap 21. As shown in Fig. 2, this flap 21 will cover the junction 22 so that there will be no chance of the member 20 coming in contact with the tube. The ends 23 and 24 of the member 20 may be made to meet or overlap within the envelope 14, and in operation may be cut so as to allow them to butt-end or slightly overlap.

It will be seen that the envelope 14 may be prepared separately and the steel or metal inner member 20 may likewise be prepared separately. The inner member 20 may then be fed into the envelope 14 and so telescoped as to place the ends 23 and 24 away from the joint 22.

It will be further noted that the flaps 18 and 19 on the envelope 14 extend out laterally, and when the tube 12 is placed in the shoe 10 the flaps 18 and 19 extend upwardly between the walls of the tube and shoe. They thus serve not only as a gripping medium to hold the guard 13 in place but, in addition, act as a protective means to save the tube against cracks or other penetrations at the side thereof. The flaps 18 and 19 also protect against the pinching of the tube.

While I have shown and described my invention as applied to a unit which may be placed in a standard shoe, it will be appreciated that the unit may be built directly in the shoe in the course of manufacture, and the effect would be very much the same as shown in Fig. 1. In building the guard directly into the shoe it will not be necessary to have the envelope 14, but a permanent covering should be cemented over the guard member 20.

I claim:

1. The combination with an inner shoe and a tube, of a tire guard comprising a flexible envelope, a one piece metal guard member in said envelope extending throughout the circumference of the shoe, and a flap on said envelope to cover the junction between the ends of said envelope.

2. The combination with a shoe and an inner tube, of a tire guard between said shoe and tube, said tire guard comprising an envelope, a single strip of flexible steel in said envelope, and flaps extending laterally from said envelope throughout its length adapted to be positioned between said shoe and tube at the side thereof to hold said guard in place.

FRANK A. HART.